United States Patent
Gong

(10) Patent No.: US 9,747,050 B2
(45) Date of Patent: Aug. 29, 2017

(54) METHOD, APPARATUS, AND CONTROLLER FOR MANAGING STORAGE ARRAY

(71) Applicant: Huawei Technologies Co., Ltd., Shenzhen (CN)

(72) Inventor: Tao Gong, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/425,165

(22) Filed: Feb. 6, 2017

(65) Prior Publication Data

US 2017/0147242 A1 May 25, 2017

Related U.S. Application Data

(63) Continuation of application No. 15/053,328, filed on Feb. 25, 2016, which is a continuation of application No. 14/134,010, filed on Dec. 19, 2013, now Pat. No. 9,292,220, which is a continuation of application No. PCT/CN2013/078504, filed on Jun. 29, 2013.

(51) Int. Cl.
*G06F 12/00* (2006.01)
*G06F 13/00* (2006.01)
*G06F 3/06* (2006.01)

(52) U.S. Cl.
CPC .......... *G06F 3/0619* (2013.01); *G06F 3/0665* (2013.01); *G06F 3/0689* (2013.01)

(58) Field of Classification Search
None
See application file for complete search history.

(56) References Cited

U.S. PATENT DOCUMENTS

| 2011/0231600 A1* | 9/2011 | Tanaka | G06F 12/0246 711/103 |
|---|---|---|---|
| 2012/0023144 A1 | 1/2012 | Rub | |
| 2012/0030428 A1* | 2/2012 | Yasufuku | G06F 12/0804 711/122 |

(Continued)

FOREIGN PATENT DOCUMENTS

| CN | 101458969 A | 6/2009 |
| CN | 101640069 A | 2/2010 |
| CN | 102081576 A | 6/2011 |

(Continued)

OTHER PUBLICATIONS

Machine Translation and Abstract of Chinese Publication No. CN101640069, dated Feb. 3, 2010, 21 pages.

(Continued)

*Primary Examiner* — Sean D Rossiter
(74) *Attorney, Agent, or Firm* — Conley Rose, P.C.

(57) ABSTRACT

A method and a controller for managing a storage array is presented. The storage array is divided into a first subset of storage devices and a second subset of storage devices according to degrees of wear of storage devices, such that a degree of wear of each of storage device in the first subset is greater than or equal to a degree of wear of any storage device in the second subset, and then, to-be-written data are written into the physical storage devices in the first subset. Therefore, service lives of storage devices in the second subset may be extended relatively by shortening service lives of storage devices in the first subset.

12 Claims, 8 Drawing Sheets

(56) References Cited

U.S. PATENT DOCUMENTS

2012/0173796 A1     7/2012    Shen
2013/0159766 A1     6/2013    D'Abreu et al.

FOREIGN PATENT DOCUMENTS

| JP | 2007180610 A | 7/2007 |
|---|---|---|
| JP | 2010015516 A | 1/2010 |
| JP | 2012243018 A | 12/2012 |
| WO | 2012132408 A1 | 10/2012 |
| WO | 2013095819 A1 | 6/2013 |

OTHER PUBLICATIONS

Machine Translation and Abstract of Chinese Publication No. CN102081576, dated Jun. 1, 2011, 10 pages.
Machine Translation and Abstract of Japanese Publication No. JP2007180610, Part 1, dated Jul. 12, 2007, 4 pages.
Machine Translation and Abstract of Japanese Publication No. JP2007180610, Part 2, dated Jul. 12, 2007, 3 pages.
Machine Translation and Abstract of Japanese Publication No. JP2010015516, Part 1, dated Jan. 21, 2010, 12 pages.
Machine Translation and Abstract of Japanese Publication No. JP2010015516, Part 2, dated Jan. 21, 2010, 4 pages.
Machine Translation and Abstract of Japanese Publication No. JP2012243018, Part 1, dated Dec. 10, 2012, 4 pages.
Machine Translation and Abstract of Japanese Publication No. JP2012243018, Part 2, dated Dec. 10, 2012, 2 pages.
Balakrishnan, M., et al., "Differential RAID: Rethinking RAID for SSD Reliability," EuroSys, dated Apr. 13-16, 2010, 12 pages.
Foreign Communication From a Counterpart Application, European Application No. 13806032.2, Extended European Search Report dated Dec. 9, 2014, 4 pages.
Foreign Communication From a Counterpart Application, European Application No. 13806032.2, European Office Action dated Jul. 29, 2015, 4 pages.
Foreign Communication From a Counterpart Application, PCT Application No. PCT/CN2013/078504, English Translation of International Search Report dated Apr. 3, 2014, 3 pages.
Foreign Communication From a Counterpart Application, PCT Application No. PCT/CN2013/078504, English Translation of Written Opinion dated Apr. 3, 2014, 13 pages.
Foreign Communication From a Counterpart Application, Canadian Application No. 2896128, Canadian Office Action dated Aug. 5, 2016, 3 pages.
Foreign Communication From a Counterpart Application, Japanese Application No 2015-523390, Japanese Office Action dated Sep. 15, 2015, 3 pages.
Foreign Communication From a Counterpart Application, Japanese Application No 2015-523390, English Translation of Japanese Office Action dated Sep. 15, 2015, 4 pages.
Foreign Communication From a Counterpart Application, Chinese Application No. 201380000793.0, Chinese Search Report dated Jun. 26, 2014, 9 pages.

* cited by examiner

Table 1

| Actual slot number | 15 | 10 | 14 | 7 | 13 | 18 | 5 | ... |
|---|---|---|---|---|---|---|---|---|
| Sequence number (i) after sequencing according to degrees of wear in descending order | 1 | 2 | 3 | 4 | 5 | 6 | 7 | |
| Degree of wear % (T) | 80.01 | 70.01 | 65.20 | 65.17 | 64.16 | 64.00 | 63.00 | ... | subset1: 70.01, 65.20
subset2: 65.17, 64.16, 64.00, 63.00

FIG. 13

Table 2

| Actual slot number | 15 | 10 | 14 | 7 | 13 | 18 | 5 | ... |
|---|---|---|---|---|---|---|---|---|
| Sequence number (i) after sequencing according to degrees of wear in descending order | 1 | 2 | 3 | 4 | 5 | 6 | 7 | |
| Degree of wear % (T) | 80.01 | 70.01 | 65.20 | 65.17 | 64.16 | 64.00 | 63.00 | ... | subsection1: 70.01, 65.20
subsection2: 65.17, 64.16
subsection3: 64.00
subsection4 to 5: 63.00 subset1: subsection1 + subsection2
subset2: subsection3 + subsection4 to 5

FIG. 14

METHOD, APPARATUS, AND CONTROLLER FOR MANAGING STORAGE ARRAY

CROSS-REFERENCE TO RELATED APPLICATIONS

This application is a continuation of U.S. patent application Ser. No. 15/053,328, filed on Feb. 25, 2016. The U.S. patent application Ser. No. 15/053,328 is a continuation of U.S. patent application Ser. No. 14/134,010, filed on Dec. 19, 2013, now U.S. Pat. No. 9,292,220. The U.S. patent application Ser. No. 14/134,010 is a continuation of International Application No. PCT/CN2013/078504, filed on Jun. 29, 2013. All of the aforementioned applications are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

Embodiments of the present invention relate to the field of storage technologies, and in particular, to a method, an apparatus, and a controller for managing a storage array.

BACKGROUND OF THE INVENTION

A Flash Memory is a non-volatile memory and is characterized by that data is not lost when power is turned off, and therefore, is widely used as an external memory and an internal memory. For example, a solid-state disk (SSD) that is increasingly used in a computer system in recent years is implemented based on the flash memory. A SSD may also be called a solid-state drive. The flash memory is characterized by the limited number of times of erasure. Each read/write operation (which may also be called an erase operation) from/to the SSD wears the SSD to a certain extent.

To meet a requirement for massive data storage, it is generally required to form an SSD storage array with multiple SSDs. Wear leveling is a concept proposed for the SSD storage array, and is essentially making wear conditions of all SSDs in the SSD storage array similar and preventing certain SSDs from being erased too frequently. However, the wear leveling may result in a situation that multiple SSDs fail concurrently, thereby causing data loss.

SUMMARY OF THE INVENTION

Embodiments of the present invention provide a method, an apparatus, and a controller for managing a storage array, so as to reduce a risk that multiple storage devices fail concurrently due to wear leveling.

A first aspect of the embodiments of the present invention provides a method implemented by a controller for managing a storage array formed by N storage devices. the method includes: acquiring degrees of wear of the N storage devices, each storage device having a degree of wear; dividing the storage devices of the storage array into a first subset of storage devices and a second subset of storage devices, such that all the degrees of wear of the storage devices in the first subset are greater than or equal to all the degrees of wear of the storage devices in the second subset; and migrating data from the storage devices in the second subset to the storage devices in the first subset; or writing to-be-written data into the first storage device subset.

In combination with the first aspect, in a first possible implementation manner, the step of dividing the storage array into a first subset and a second subset includes: sequencing the N storage devices according to the degrees of wear of the N storage devices in descending order, wherein a storage device with a maximum degree of wear is numbered 1, and a storage device with a minimum degree of wear is numbered N; calculating a difference between degrees of wear of an $i^{th}$ storage device and an $(i+1)^{th}$ storage device, wherein $0<i<N$; taking a $1^{st}$ to the $i^{th}$ storage devices as the first subset and the $(i+1)^{th}$ to an $N^{th}$ storage devices as the second subset when the difference between the degrees of wear of the $i^{th}$ storage device and the $(i+1)^{th}$ storage device is smaller than or equal to a first wear threshold; adding 1 to i; and continuing to calculate a difference between degrees of wear of an $i^{th}$ storage device and an $(i+1)^{th}$ storage device when the difference between the degrees of wear of the $i^{th}$ storage device and the $(i+1)^{th}$ storage device is greater than the first wear threshold.

In combination with the first aspect, in a second possible implementation manner, the step of dividing the storage array into a first subset and a second subset includes: grouping the N storage devices into S subsections, such that all the degrees of wear of storage devices in a $j^{th}$ subsection are greater than or equal to all the degrees of wear of storage devices in an $(j+1)^{th}$ subsection, and $0<j<S$; calculating the number of storage devices in a $1^{st}$ subsection to the $j^{th}$ subsection; taking the storage devices in the $1^{st}$ subsection to the $j^{th}$ subsection as the first subset and the storage devices in the $(j+1)^{th}$ subsection to an $S^{th}$ subsection as the second subset when the number of the storage devices in the $1^{st}$ subsection to the $j^{th}$ subsection is greater than or equal to N/2; adding 1 to j; and continuing to calculate the number of storage devices in the $1^{st}$ subsection to a $j^{th}$ subsection when the number of the storage devices in the $1^{st}$ subsection to the $j^{th}$ subsection is smaller than N/2.

In combination with the first aspect, in a third possible implementation manner, the step of dividing the storage array into a first subset and a second subset comprises: grouping the N storage devices into S subsections, such that all the degrees of wear of storage device in a $j^{th}$ subsection are greater than or equal to all the degrees of wear of storage devices in an $(j+1)^{th}$ subsection, and $0<j<S$; and taking the storage devices in a $1^{st}$ subsection to the $j^{th}$ subsection as the first subset and the storage devices in the $(j+1)^{th}$ subsection to an $S^{th}$ subsection as the second subset, wherein $j=\lfloor S/2 \rfloor$, indicating rounding S/2 down, or $j=\lceil S/2 \rceil$, indicating rounding S/2 up.

The grouping the N storage devices into S subsections includes: sequencing the N storage devices according to the degrees of wear in descending order, where a storage device with a maximum degree of wear is numbered 1, and a storage device with a minimum degree of wear is numbered N; calculating a difference between degrees of wear of an $i^{th}$ storage device and an $(i+1)^{th}$ storage device, where $0<i<N$; when the difference between the degrees of wear is smaller than or equal to a second wear threshold, grouping the $i^{th}$ storage device into one subsection, grouping the $(i+1)^{th}$ storage device into another subsection, adding 1 to i, and continuing to calculate a difference between degrees of wear of an $i^{th}$ storage device and an $(i+1)^{th}$ storage device; and when the difference between the degrees of wear is greater than the second wear threshold, grouping the $(i+1)^{th}$ storage device into a subsection to which the $i^{th}$ storage device belongs, adding 1 to i, and continuing to calculate a difference between degrees of wear of an $i^{th}$ storage device and an $(i+1)^{th}$ storage device.

In combination with the first aspect, in a fourth possible implementation manner, the step of dividing the storage array into a first subset and a second subset comprises: forming the first subset with storage devices whose degrees of wear are greater than or equal to a first wear threshold; and forming the second subset with storage devices whose degrees of wear are smaller than the first wear threshold.

In combination with the first aspect or any one of the first to the fourth possible implementation manners of the first aspect, in a fifth possible implementation manner, the migrating data from the second storage device subset to the first storage device subset includes: collecting statistics about a free storage space FreeSize in the first storage device subset; and extracting data of FreeSize/(N−i) from each storage device in the second storage device subset, and migrating data to the first storage device subset, where i indicates the number of storage devices in the first storage device subset.

In combination with the first aspect or the second to the third possible implementation manners of the first aspect, in a sixth possible implementation manner, an amount of data added to each subsection in the first storage device subset is equal or starts to decrease progressively from the $1^{st}$ subsection; and an amount of data extracted from each subsection in the second storage device subset is equal or starts to decrease progressively from the $S^{th}$ subsection.

In combination with the sixth possible implementation manner of the first aspect, in a seventh possible implementation manner, when the amount of data extracted from each subsection in the second storage device subset is equal, data of (FreeSize−FreeSizeA)/(N−X) is extracted from each storage device in the second storage device subset and migrated to the first storage device subset, where FreeSize indicates a free storage space in the first storage device subset before the data migration, FreeSizeA indicates a free storage space in the first storage device subset after the data migration, and X indicates the number of storage devices in the first storage device subset.

A second aspect provides an apparatus for managing a storage array, where the storage array is formed by N storage devices, and the apparatus includes: an acquiring module, configured to acquire degrees of wear of the N storage devices; a dividing module, configured to divide the storage array into a first storage device subset and a second storage device subset according to the degrees of wear of the N storage devices, where a minimum degree of wear of a storage device in the first storage device subset is greater than or equal to a maximum degree of wear of a storage device in the second storage device subset; and a processing module, configured to migrate data from the second storage device subset to the first storage device subset, or write to-be-written data into the first storage device subset.

In combination with the second aspect, in a first possible implementation manner, the dividing module is configured to: sequence the N storage devices according to the degrees of wear in descending order, where a storage device with a maximum degree of wear is numbered 1, and a storage device with a minimum degree of wear is numbered N; calculate a difference between degrees of wear of an $i^{th}$ storage device and an $(i+1)^{th}$ storage device, where 0<i<N; when the difference between the degrees of wear is smaller than or equal to a first wear threshold, take the $1^{st}$ to the $i^{th}$ storage devices as the first storage device subset, and take the $(i+1)^{th}$ to the $N^{th}$ storage devices as the second storage device subset; and when the difference between the degrees of wear is greater than the first wear threshold, add 1 to i, and continue to calculate a difference between degrees of wear of an $i^{th}$ storage device and an $(i+1)^{th}$ storage device.

In combination with the second aspect, in a second possible implementation manner, the dividing module is configured to: group the N storage devices into S subsections according to the degrees of wear of the N storage devices, where a minimum degree of wear of a storage device in a $j^{th}$ subsection is greater than or equal to a maximum degree of wear of a storage device in a $(j+1)^{th}$ subsection, and 0<j<S; calculate the number of storage devices in a $1^{st}$ subsection to the $j^{th}$ subsection; when the number of the storage devices in the $1^{st}$ subsection to the $j^{th}$ subsection is greater than or equal to N/2, take the storage devices in the $1^{st}$ subsection to the $j^{th}$ subsection as the first storage device subset, and take storage devices in the $(j+1)^{th}$ subsection to an $S^{th}$ subsection as the second storage device subset; and when the number of the storage devices in the $1^{st}$ subsection to the $j^{th}$ subsection is smaller than N/2, add 1 to j, and continue to calculate the number of storage devices in the $1^{st}$ subsection to a $j^{th}$ subsection.

In combination with the second aspect, in a third possible implementation manner, the dividing module is configured to: group the N storage devices into S subsections according to the degrees of wear of the N storage devices, where a minimum degree of wear of a storage device in a $j^{th}$ subsection is greater than or equal to a maximum degree of wear of a storage device in a $(j+1)^{th}$ subsection, and 0<j<S; and take storage devices in a $1^{st}$ subsection to the $j^{th}$ subsection as the first storage device subset, and take storage devices in the $(j+1)^{th}$ subsection to an $S^{th}$ subsection as the second storage device subset, where $j=\lfloor S/2 \rfloor$, indicating rounding S/2 down, or $j=\lceil S/2 \rceil$, indicating rounding S/2 up.

In combination with the second aspect, in a fourth possible implementation manner, the dividing module is configured to: form the first storage device subset with storage devices whose degrees of wear are greater than or equal to a first wear threshold, and form the second storage device subset with storage devices whose degrees of wear are smaller than the first wear threshold.

In combination with the second aspect or any one of the first to the fourth possible implementation manners of the second aspect, in a fifth possible implementation manner, the processing module is configured to: collect statistics about a free storage space FreeSize in the first storage device subset; and extract data of FreeSize/(N−i) from each storage device in the second storage device subset, and migrate data to the first storage device subset, where i indicates the number of storage devices in the first storage device subset.

In combination with the second aspect or the second or the third possible implementation manner of the second aspect, in a sixth possible implementation manner, an amount of data added to each subsection in the first storage device subset is equal or starts to decrease progressively from the $1^{st}$ subsection; and an amount of data extracted from each subsection in the second storage device subset is equal or starts to decrease progressively from the $S^{th}$ subsection.

In combination with the sixth possible implementation manner of the second aspect, in a seventh possible implementation manner, when the amount of data extracted from each subsection in the second storage device subset is equal, data of (FreeSize−FreeSizeA)/(N−X) is extracted from each storage device in the second storage device subset and migrated to the first storage device subset, where FreeSize indicates a free storage space in the first storage device subset before the data migration, FreeSizeA indicates a free storage space in the first storage device subset after the data migration, and X indicates the number of storage devices in the first storage device subset.

In combination with the second aspect or any one of the second to the seventh possible implementation manners of the second aspect, in an eighth possible implementation manner, the apparatus further includes a comparing module, configured to compare degrees of wear of storage devices in the second storage device subset with a fourth wear threshold; and if a degree of wear of at least one storage device in the second storage device subset is greater than or equal to the fourth wear threshold, the processing module migrates the data from the second storage device subset to the first storage device subset.

A third aspect provides a controller of a storage array, including: a processor, a memory, a system bus, and a communications interface, where the processor, the memory, and the communications interface are connected to and communicate with each other through the system bus. The memory is configured to store computer-executable instructions. The processor is configured to run the computer execution instruction to execute the method for managing a storage array described in the first aspect.

A fourth aspect provides a computer program product, including a computer-readable storage medium that stores a program code, where an instruction included in the program code is used to execute the method for managing a storage array described in the first aspect.

In the embodiments of the present invention, a storage array is divided into a first subset and a second subset according to degrees of wear of storage devices, where a minimum degree of wear of a storage device in the first subset is greater than or equal to a maximum degree of wear of a storage device in the second device subset, and then, data in the storage device of the second subset is migrated to the storage devices of the first subset or to-be-written data is written into the storage devices in the first subset. Therefore, service lives of storage devices in the second subset may be extended relatively by shortening service lives of storage devices in the first subset, thereby widening an interval between time when a storage device in the first subset fails and time when a storage device in the second subset fails, reducing a risk that multiple storage devices fail concurrently due to wear leveling, and improving data reliability.

BRIEF DESCRIPTION OF THE DRAWINGS

To illustrate the technical solutions in the embodiments of the present invention more clearly, the following briefly introduces accompanying drawings required for describing the embodiments or the prior art. Apparently, the accompanying drawings in the following description show merely some embodiments of the present invention, and a person of ordinary skill in the art may still derive other drawings according to these accompanying drawings without creative efforts.

FIG. 13 is a schematic table for showing example of division of storage device subsets according to an embodiment of the present invention; and FIG. 14 is a schematic table for showing example of division of storage device subsets according to another embodiment of the present invention.

DETAILED DESCRIPTION OF THE EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

The embodiments of the present invention provide a method, an apparatus, and a controller for managing a storage array, which can reduce a risk that multiple storage devices fail concurrently due to wear leveling. A read/write operation from/to a storage device in the embodiments of the present invention is called wear to the storage device. A failure of a storage device refers to wear-out of the storage device, and the storage device needs to be replaced.

System Architecture in an Embodiment of the Present Invention

Figure 1:
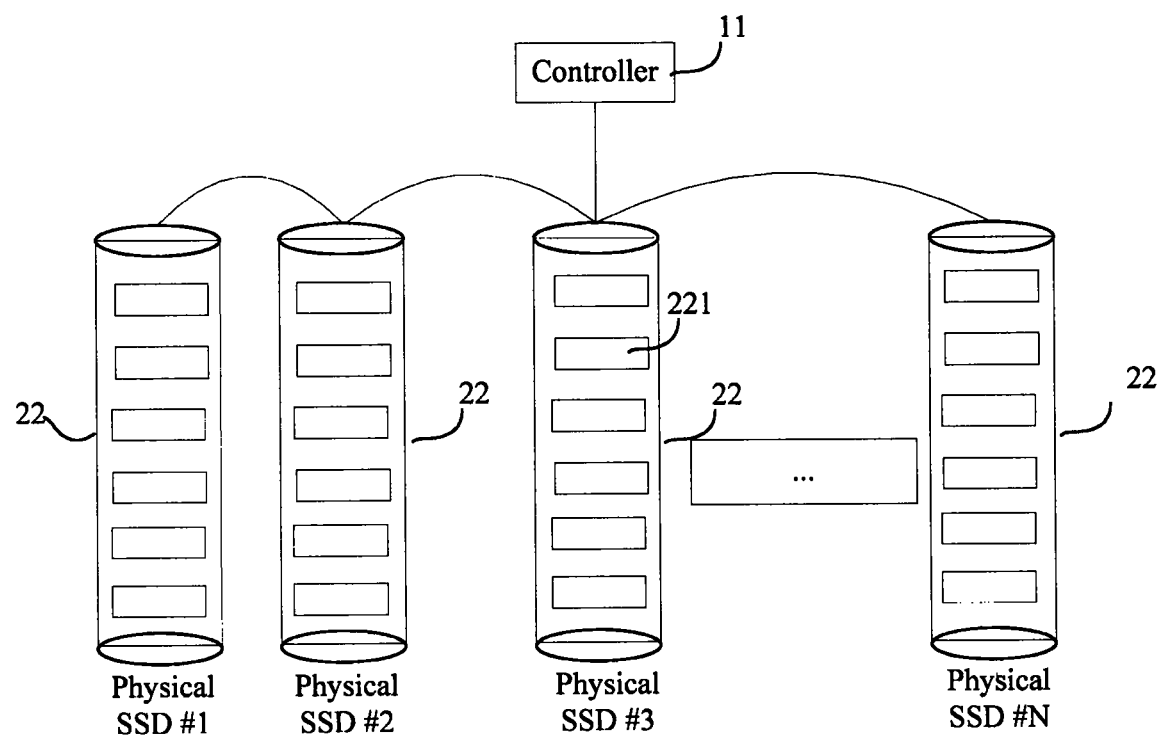
FIG. 1 is a composition diagram of a storage system according to an embodiment of the present invention.

A method for managing a storage array provided in this embodiment of the present invention may be implemented in a storage system. FIG. 1 is a schematic diagram of system architecture of a method for managing a storage array according to an embodiment of the present invention. As shown in FIG. 1, the storage system includes a controller 11 and storage devices 22. In this embodiment, that the storage devices 22 are SSDs is taken as an example for description. A SSD may also be called a solid-state drive, and is called a disk for short.

FIG. 1 is merely for exemplary description rather than limiting a specific networking manner; for example, both cascading tree networking and ring networking are applicable, provided that the controller 11 and the storage devices 22 can communicate with each other.

The controller 11 may include any computing device known in the prior art, for example, a server or a desktop computer. An operating system and other applications are installed inside the controller 11. The controller 11 may manage the storage devices 22, for example, control data migration between the storage devices, and acquire degrees of wear of the storage devices. Because a flash memory is characterized by the limited number of times of erasure, each read/write operation (which may also be called an erase operation) from/to a storage device wears the storage device to a certain extent. A degree of wear may also be called a wear extent, and may be used to measure a service life of a storage device. The degree of wear may be represented by a percentage.

The storage devices 22 may include storage devices known in the prior art, for example, SSDs or Direct Access Storage Devices (DASDs). In FIG. 1, that the storage devices 22 are SSDs is taken as an example for description. N physical SSDs form a storage array. A basic idea of the storage array is to combine multiple relatively inexpensive disks to deliver aperformance equal to or even stronger than that of an expensive large-capacity disk. The storage array includes N physical SSDs, and each physical SSD has a unique number, for example, a physical SSD #1, a physical SSD #2, a physical SSD #3, . . . , and a physical SSD #N in the figure. In addition, the number N of physical SSDs in a storage array should not be smaller than a certain lower limit, for example, 10; and the number N of physical SSDs in a storage array should not be greater than a certain upper limit, for example, 30. The N physical SSDs included in the storage array may be SSDs with different models and different capacities, or SSDs with different models but a same capacity, or SSDs with a same model but different capacities, or SSDs with a same model and a same capacity.

Unless otherwise specified, SSDs in this embodiment of the present invention all refer to physical SSDs.

Each physical SSD may be divided into fine-grained equal-sized chunks (CKs) 221. A chunk may also be called a logical SSD. To measure a capacity of each physical SSD, the number of logical SSDs obtained through dividing each physical SSD may be called a weight of the physical SSD. For example, if all physical SSDs in a certain storage array are divided into logical SSDs of 32 megabyte (MB) each, a weight of a physical SSD with a capacity of 200 gigabyte (GB) is 6400, and a weight of a physical SSD with a capacity of 100 GB is 3200.

In addition, multiple CKs 221 may form a logical space according to a redundant array of independent disks (RAID) with a specified type, and the logical space is a chunk group (CKG). All CKs included in a CKG must belong to different SSDs. The redundant array of independent disks is also called a RAID.

A RAID 5 is taken as an example. At least three disks are needed for implementing a RAID 5 technology, data and corresponding parity information are stored on each of disks that form the RAID 5, and the parity information and corresponding data are separately stored on different disks. When data on one disk of the RAID 5 is corrupted, remaining data and corresponding parity information may be used to restore the corrupted data.

For example, if 25 physical SSDs form a storage array (also called a disk group), a capacity of each physical SSD is 100 GB and a capacity of a logical SSD is 32 MB, a weight of each physical SSD is 3200. Assume that logical SSDs in this storage array form a RAID 5. For a specific forming method, reference may be made to the following:

The 25 physical SSDs in the storage array execute random_select(25, 9), to obtain nine physical SSDs, where in a random_select(x, y) function, y≤x, indicating that y objects are randomly selected from x objects.

Each SSD among the nine physical SSDs executes random_select(F, 1), where F indicates logical SSDs of each physical SSD that have not been selected to form a RAID, and random_select(F, 1) indicates that one logical SSD is selected from the logical SSDs that have not been selected to form the RAID. Nine logical SSDs selected from the nine physical SSDs are recorded, and the nine logical SSDs form a RAID 5 with parity data. Meanwhile, a value of a variable RAID_NUM is updated, where RAID_NUM is the number of established RAIDs. A formed RAID may also be called a formed RAID group.

In addition, a certain space in the storage array needs to be reserved for hot backup. The hot backup space is a storage space reserved in the storage array for restoring data. For example, if at least a storage space needs to be reserved for data reconstruction after a single disk fails, it needs to determine whether the data reconstruction is possibly performed in the reserved storage space after the single disk fails. If an unused storage space is larger than a capacity of the single disk, a new RAID group may be further established. If an unused storage space is smaller than the capacity of the single disk, it indicates that another RAID group cannot be established and the unused storage space needs to be used as the hot backup space. The unused storage space, that is, a storage space that has not been actually used to bear a service, may also be called a free storage space or a free space.

Figure 2:
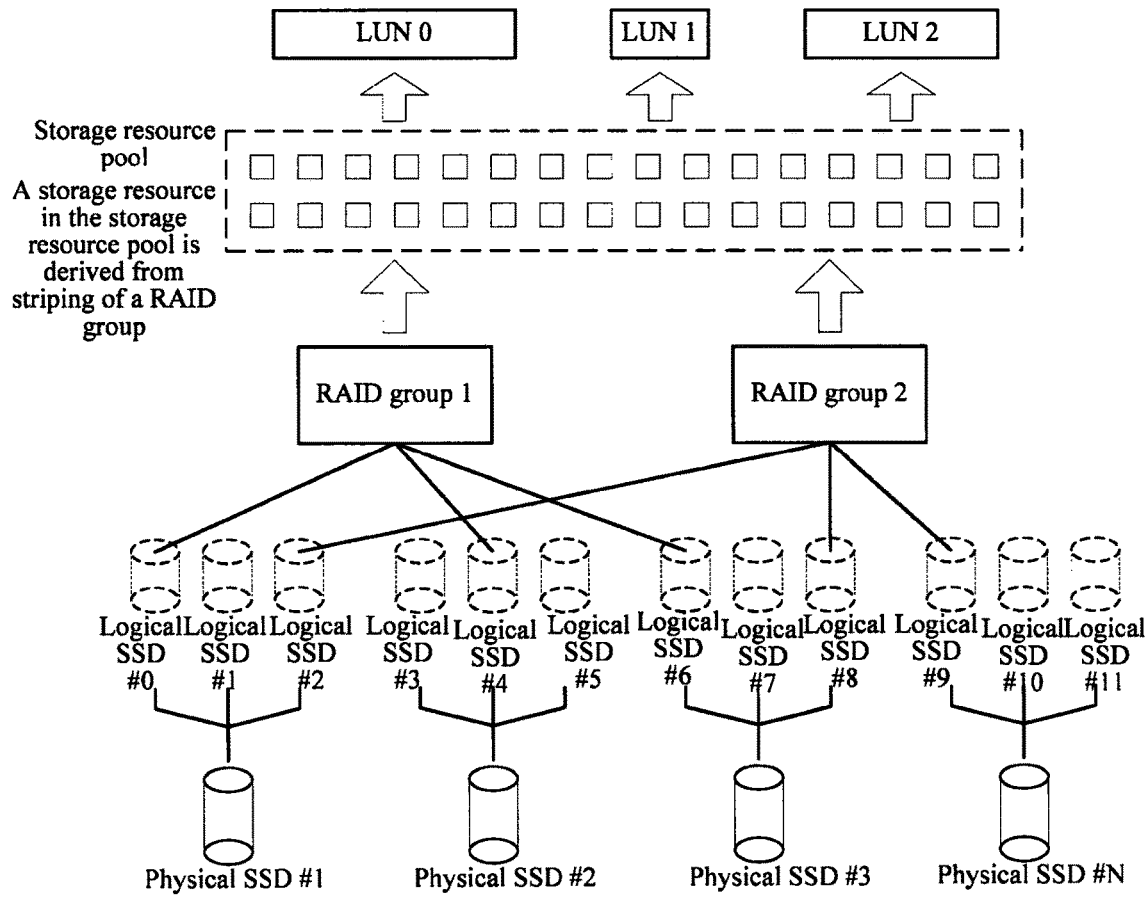
FIG. 2 is a schematic diagram of storage resource pooling according to an embodiment of the present invention.

For the RAID_NUM RAID groups established in the preceding step, striping processing is performed, and each strip or strip unit is an independent storage resource. Each strip or several adjacent strips are put into a same storage resource pool as a storage resource. Then several storage blocks are randomly selected from the storage resource pool to form a storage space with a logical unit number (LUN) and serve the controller. For details, see FIG. 2.

In the storage array established by using the preceding method, services for each LUN may be evenly distributed to each physical SSD, so that a service burden on each physical SSD matches a weight (capacity) of each physical SSD. If capacities of SSDs are different, an SSD with a larger capacity needs to bear relatively more services, and an SSD with a smaller capacity needs to bear relatively fewer services. A service burden is directly proportional to a capacity. Therefore, a difference between degrees of wear of all SSDs is small, which may be called wear leveling.

Figure 3:
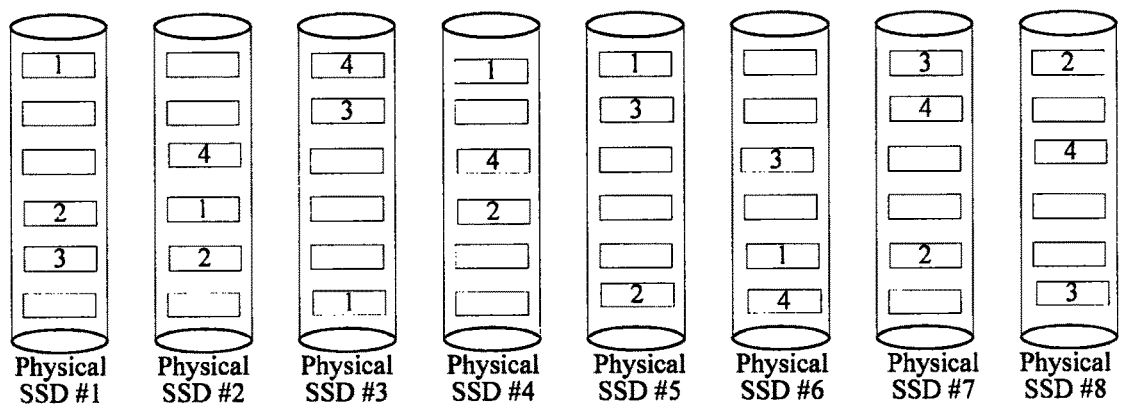
FIG. 3 is a schematic diagram of wear leveling according to an embodiment of the present invention.

As shown in FIG. 3, logical SSDs with a same number form a RAID, and a logical SSD without a number indicates that the logical SSD has not been used. According to the preceding method, services for each LUN may be evenly distributed to each SSD. In addition, the larger the number of logical SSDs obtained through dividing each physical SSD is, the better a leveling effect is.

Method for Managing a Storage Array

Figure 4:
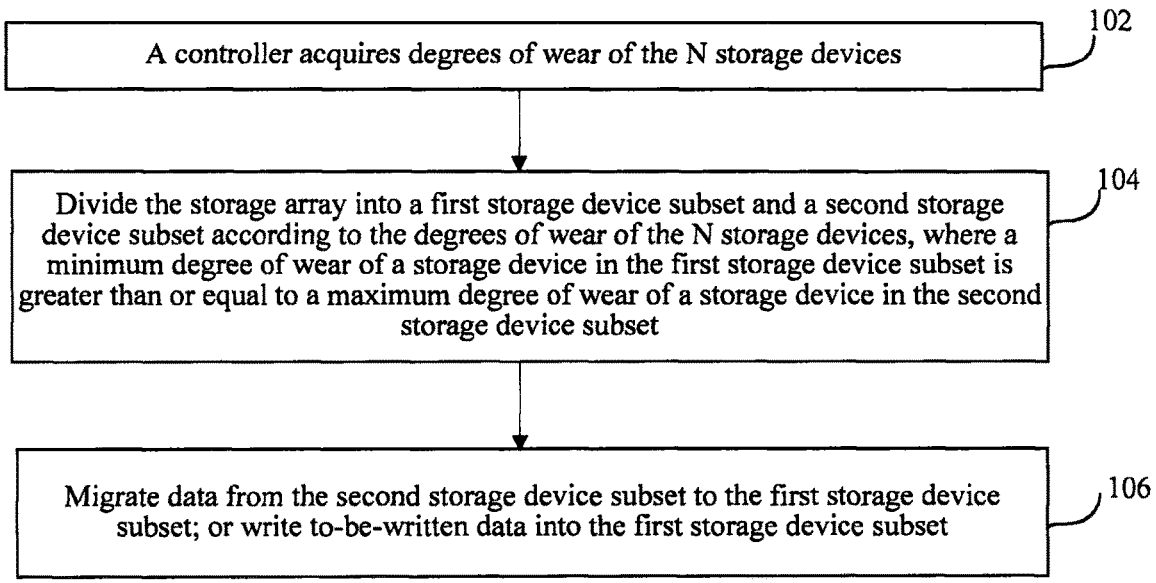
FIG. 4 is a flowchart of a method according to an embodiment of the present invention.

The following introduces a method for managing a storage array provided in an embodiment of the present invention. As shown in FIG. 4, a flowchart of a method for managing a storage array according to an embodiment of the present invention is provided. That the storage array is formed by N storage devices is taken as an example for description, and the method includes:

Step 102: A controller acquires degrees of wear of the N storage devices.

A degree of wear may also be called a wear extent, and may be used to measure a service life of a storage device. The degree of wear is generally represented by a percentage. In this embodiment of the present invention, the degree of wear is represented by T.

The controller may actively send a request command at a certain time interval, to request the storage devices in the storage array to tell the controller their degrees of wear; for example, the controller delivers a SMART command to the storage devices, to request the degrees of wear of the storage devices. The storage devices may also actively tell the controller their degrees of wear at a certain time interval without basing on a request of the controller. Statistics about the degrees of wear of the N storage devices may also be collected according to empirical values and service durations of the storage devices. This is not limited in the embodiment of the present invention.

The controller periodically acquires the degrees of wear of the N storage devices, and specifically, the controller acquires the degrees of wear of the N storage devices at a time interval such as one week or two weeks.

A degree of wear of a storage device is measured according to an actual volume of borne services.

Generally, the number N of the storage devices in the storage array should not be smaller than a certain lower limit, for example, 10, and should not be greater than a certain upper limit, for example, 30.

Step 104: Divide the storage array into a first storage device subset and a second storage device subset according to the degrees of wear of the N storage devices, where a minimum degree of wear of a storage device in the first storage device subset is greater than or equal to a maximum degree of wear of a storage device in the second storage device subset.

Certainly, when degrees of wear of M storage devices are greater than or equal to a preset wear threshold, an action of dividing the storage array into a first storage device subset and a second storage device subset according to the degrees of wear of the N storage devices (storage array division for short) may be enabled, where $1 \leq M \leq N$.

M may be set to 1, indicating that as long as there is one storage device whose degree of wear exceeds the preset wear threshold, the storage array division is enabled.

Certainly, M may also be set to 2 or any value not greater than N. In addition, M may be dynamically adjusted through a reserved external interface. For example, M may be first set to 1, indicating that if it is found that a degree of wear of a certain storage device reaches the preset wear threshold for the first time, the storage array division is enabled. Subsequently, M is set to 2, indicating that if it is found that degrees of wear of two storage devices reach the preset wear threshold, the storage array division is enabled.

M may be adjusted according to N and a difference between degrees of wear of storage devices in the second storage device subset. When the difference between the degrees of wear of the storage devices in the second storage device subset is relatively small, M may be properly set to a relatively small value (for example, M is set to 1). In this case, the storage array division is enabled in a relatively frequent manner. When the difference between the degrees of wear of the storage devices in the second storage device subset is relatively large, M may be properly set to a relatively large value (for example, M is set to 5). In this case, the storage array division is not enabled in such a frequent manner.

The preset wear threshold may be preset according to an empirical value, and then dynamically adjusted through a reserved external interface. The preset wear threshold may be represented by a percentage. If degrees of wear of all storage devices in the storage array are smaller than the preset wear threshold, in this scenario, all storage devices properly bear a service burden of the whole array according to weight values. If there is no performance bottleneck on a single disk, the storage array division is not performed.

Figure 6:
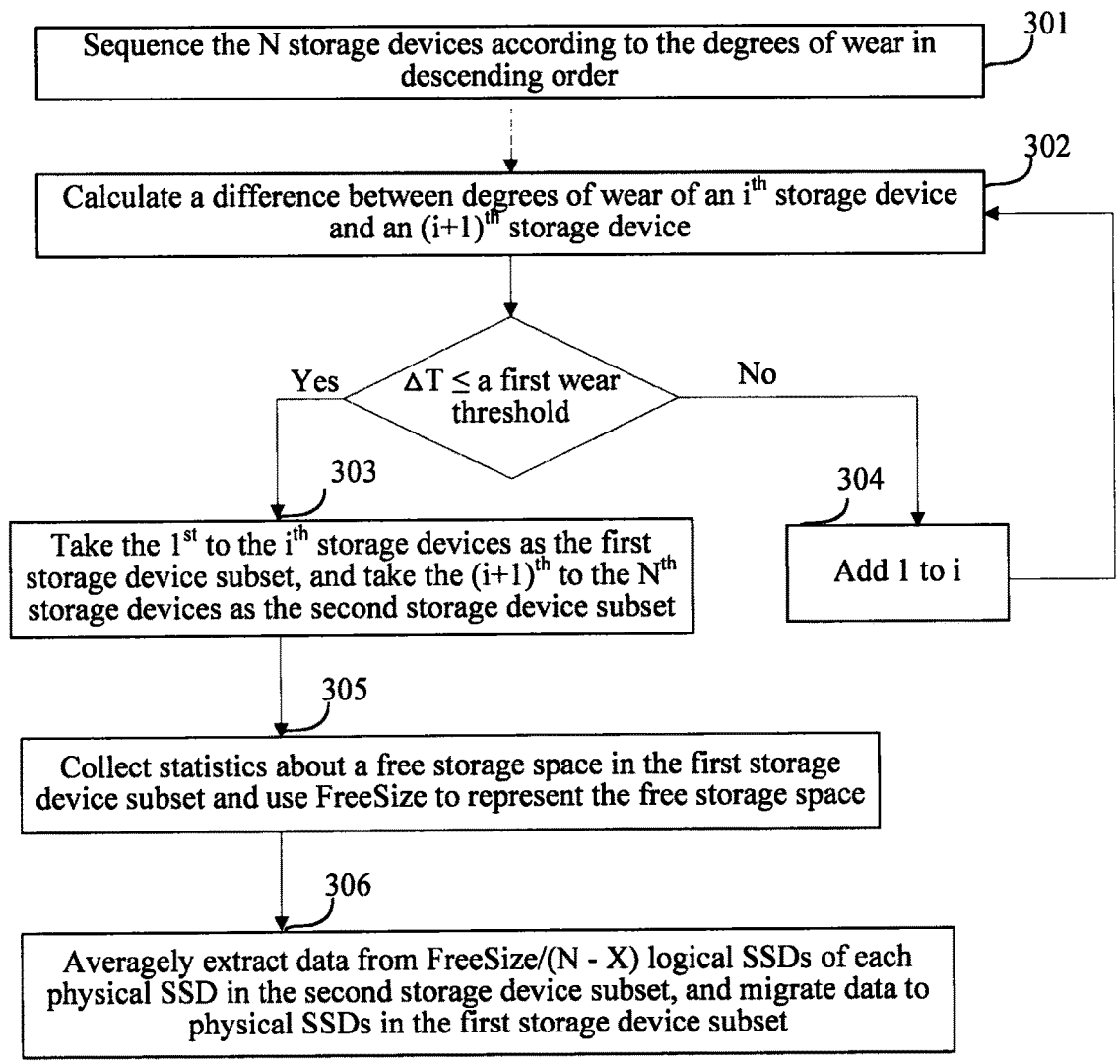
FIG. 6 is a flowchart of another method according to an embodiment of the present invention.
Figure 7:
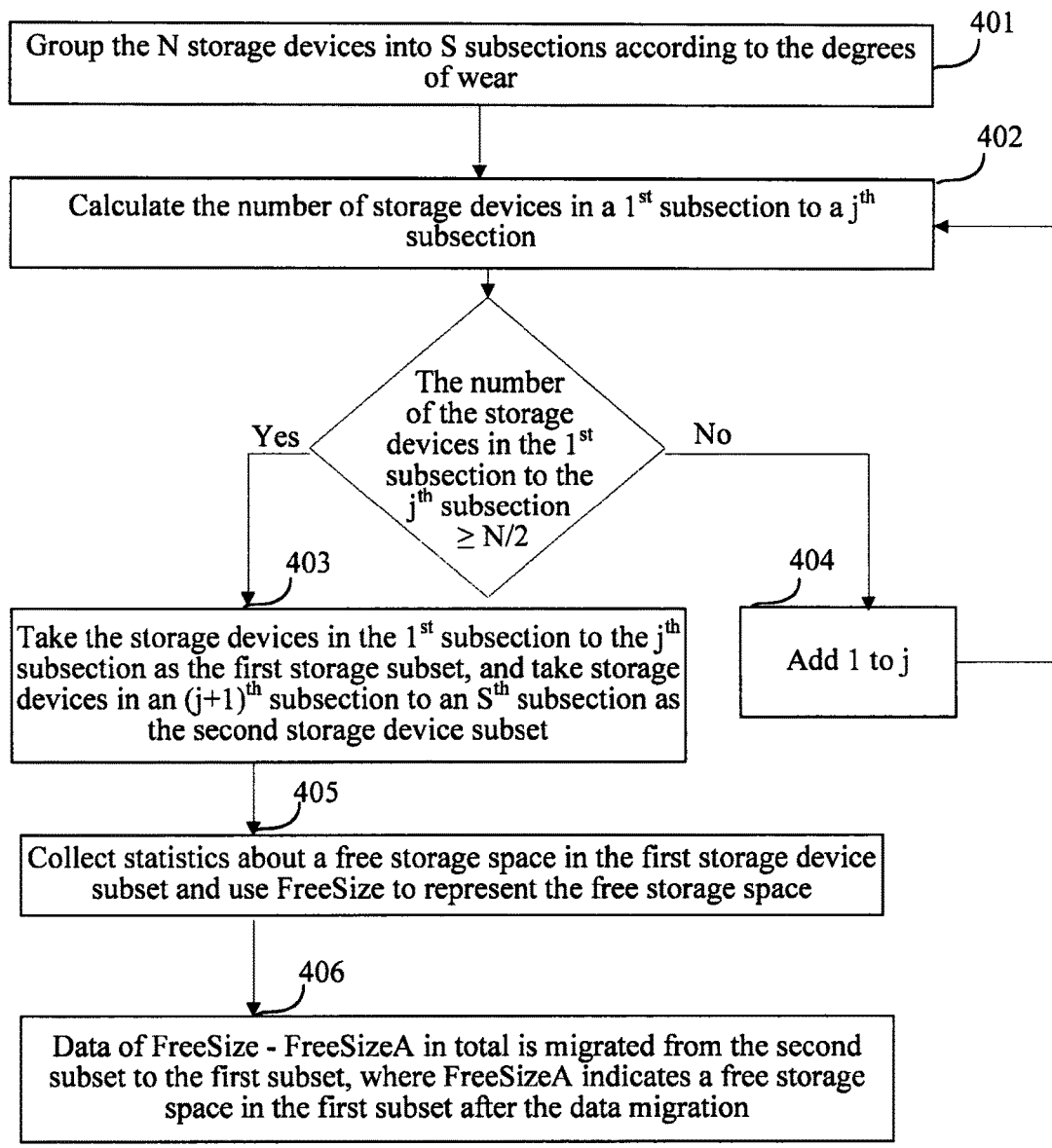
FIG. 7 is a flowchart of another method according to an embodiment of the present invention.
Figure 8:
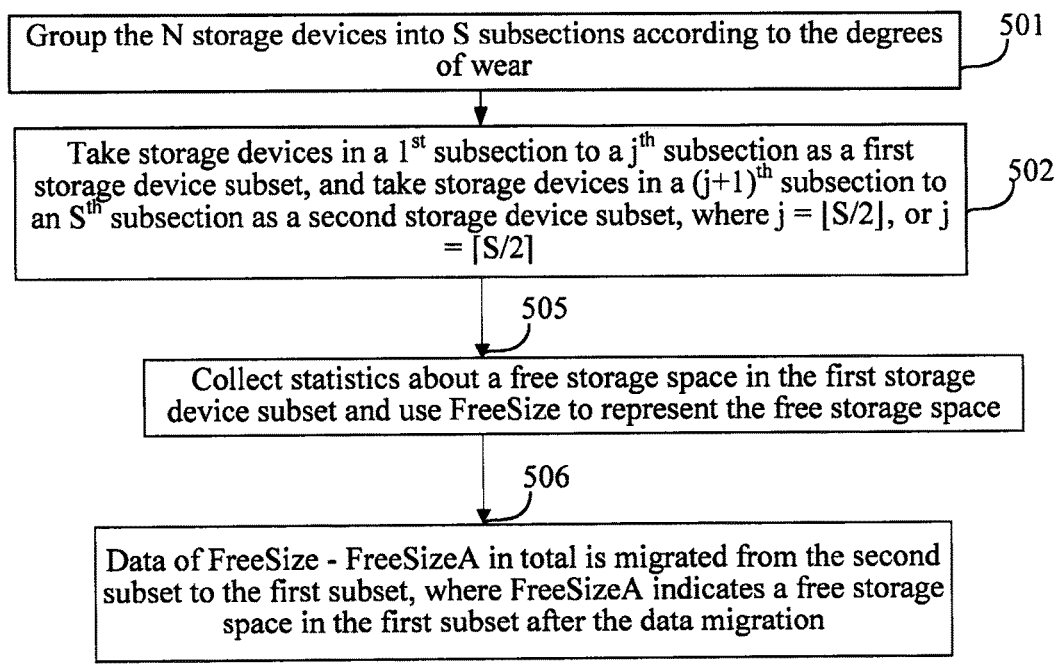
FIG. 8 is a flowchart of still another method according to an embodiment of the present invention.

For how to divide the storage array into the first storage device subset and the second storage device subset according to the degrees of wear of the N storage devices, reference may be made to descriptions of FIG. 6, FIG. 7, and FIG. 8.

It may be the first storage device subset and the second storage device subset that form the whole storage array; and it may also be the first storage device subset, the second storage device subset, and a third storage device subset that form the whole storage array, where data in the third storage device subset does not need to be adjusted, that is to say, data migration, including data migration-in or migration-out, is not performed.

Preferably, in this embodiment of the present invention, a storage array formed by only storage devices for which data migration is required may be understood as the storage array formed by the N storage devices.

Step 106: Migrate data from the second storage device subset to the first storage device subset; or write to-be-written data into the first storage device subset.

For how to perform data migration, reference may be made to descriptions of FIG. 6, FIG. 7, and FIG. 8.

If an original address is accessed for each write operation, the data in the second storage device subset may be migrated to the first storage device subset; and if a new address is accessed for each write operation, the to-be-written data may be directly written into a free space in the first storage device subset, instead of migrating the data from the second storage device subset to the first storage device subset.

Accordingly, the first storage device subset may be called a target storage device subset or a first subset; and the second storage device subset may be called a source storage device subset or a second subset.

After a period of time, no degree of wear of a newly-added storage device is greater than or equal to the preset wear threshold, degrees of wear of storage devices in the second storage device subset are smaller than or equal to those of storage devices in the first storage device subset, services in the second storage device subset are evenly distributed to the storage devices in the second storage device subset, and services in the first storage device subset are evenly distributed to the storage devices in the first storage device subset; or after a period of time, the second storage device subset is blank, and all services are evenly distributed to storage devices in the first storage device subset. Even distribution refers to distribution according to weights.

Figure 5:
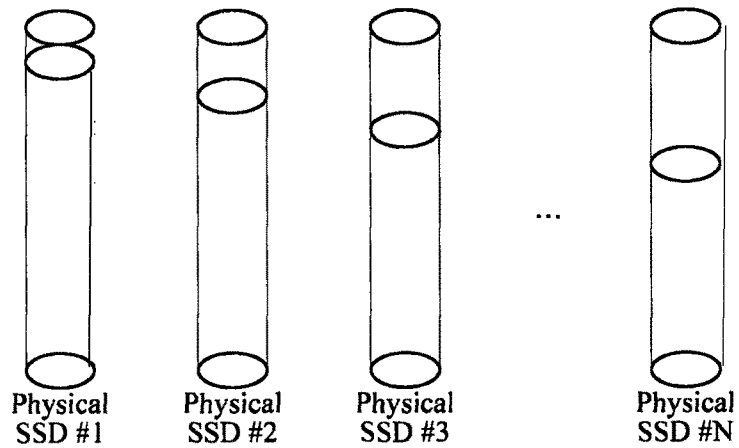
FIG. 5 is a schematic diagram of an effect according to an embodiment of the present invention.

FIG. 5 shows a diagram of an effect achieved by using the preceding method as described in FIG. 4. Certainly, FIG. 5 is merely for exemplary description. Dark-colored areas in FIG. 5 indicate degrees of wear, and the higher a ratio that a dark-colored area occupies is, the higher a degree of wear is.

In this embodiment of the present invention, a storage array is divided into a first storage device subset and a second storage device subset according to degrees of wear of storage devices, where a minimum degree of wear of a storage device in the first storage device subset is greater than or equal to a maximum degree of wear of a storage device in the second storage device subset, and then, data in the second storage device subset is migrated to the first storage device subset. Therefore, service lives of storage devices in the second storage device subset may be extended relatively by shortening service lives of storage devices in the first storage device subset, thereby widening an interval between time when a storage device in the first storage device subset fails and time when a storage device in the second storage device subset fails, reducing a risk that multiple storage devices fail concurrently due to wear leveling, and improving data reliability.

If a new address is accessed for each write operation, to-be-written data may be directly written into a free space in the first storage device subset, instead of migrating the data from the second storage device subset to the first storage device subset. Services borne by the storage devices in the second storage device subset are maintained by increasing services borne by the storage devices in the first storage device subset, and the service lives of the storage devices in the second storage device subset are extended relatively by shortening the service lives of the storage devices in the first storage device subset, thereby widening an interval between time when a storage device in the first storage device subset fails and time when a storage device in the second storage device subset fails, reducing a risk that multiple storage devices fail concurrently due to wear leveling, and improving data reliability.

In this embodiment, the risk that multiple storage devices fail concurrently due to wear leveling may be reduced by widening the interval between the time when a storage device in the first storage device subset fails and the time when a storage device in the second storage device subset fails. Therefore, the method described in this embodiment may also be called a non-wear leveling method or an anti-wear leveling method. Accordingly, in this embodiment of the present invention, the action of dividing the storage array into a first storage device subset and a second storage device subset according to the degrees of wear of the storage devices may also be called an action of enabling anti-wear leveling.

Before Step 106 is performed, the method in FIG. 4 may further include:

Step 105 (not shown in FIG. 4): Compare the degrees of wear of the storage devices in the second storage device subset with a fourth wear threshold; that is, determine whether the degrees of wear of all storage devices in the second storage device subset are smaller than the fourth wear threshold. If the degrees of wear of all storage devices in the second storage device subset are smaller than the fourth wear threshold, Step 106 is no longer performed. That is to say, a service burden on the storage devices in the second storage device subset is not heavy, and therefore, an action of anti-wear leveling is temporarily not needed; or after the data is migrated by using the management method described in this embodiment of the present invention, a service burden on the storage devices in the second storage device subset is not heavy, and therefore, an action of anti-wear leveling is temporarily not needed.

If a degree of wear of at least one storage device in the second storage device subset is greater than or equal to the fourth wear threshold, step 106 is performed.

The fourth wear threshold may be the same as or different from the preset wear threshold described in the preceding embodiment.

In this embodiment of the present invention, a frequency for anti-wear leveling adjustment may be reduced by comparing the degrees of wear of the storage devices in the second storage device subset with the fourth wear threshold.

FIG. 6, FIG. 7, and FIG. 8 are taken as examples to describe in detail how to divide the storage array into a first storage device subset and a second storage device subset according to the degrees of wear of the N storage devices and how to migrate data from the second storage device subset to the first storage device subset. Certainly, the present invention is not limited to the methods shown in FIG. 6, FIG. 7, and FIG. 8.

As shown in FIG. 6, the following steps are included:

Step 301: Sequence the N storage devices according to the degrees of wear in descending order, where a storage device with a maximum degree of wear is numbered 1, and a storage device with a minimum degree of wear is numbered N.

The sequencing may be performed inside a memory of a controller.

The sequencing may be performed according to the degrees of wear in descending order or in ascending order, as long as it can help correctly complete division of storage device subsets. This is not limited in the embodiment of the present invention.

In this embodiment of the present invention, the sequencing performed in descending order is taken as an example for description.

Step 302: Calculate a difference $\Delta T$ between degrees of wear of an $i^{th}$ storage device and an $(i+1)^{th}$ storage device, where $0<i<N$; start the calculation first from the $i^{th}$ storage device, where $i=1$; when the difference between the degrees of wear is smaller than or equal to a first wear threshold, perform step 303; and when the difference between the degrees of wear is greater than the first wear threshold, perform step 304.

The first wear threshold may be determined according to service lives of the storage devices and a predicted time interval between time when two storage devices fail. There are multiple methods for determining the first wear threshold. The method provided herein is merely exemplary, and is not limited in the embodiment of the present invention. A failure of a storage device refers to wear-out of the storage device, and the storage device needs to be replaced. If it is expected that two storage devices do not fail concurrently and an expected time interval between time when the two storage devices fail is 2 to 3 weeks, for example, 2.6 weeks, the first wear threshold may be 0.385%*2.6≈1%. It is assumed that 0.385% is a weekly average degree of wear of a storage device and discovered through collecting statistics in an actual service. Certainly, 0.385% is merely exemplary, and may be a different value in actual use. If the expected time interval between the time when the two storage devices fail is 10 days, for example, 1.5 weeks, the first wear threshold may be 0.385%*1.5≈0.58%. A specific expected time interval between the time when the two storage devices fail may be determined by comprehensively considering a time interval for locally replacing a storage device.

Table 1 is taken as an example for description, and it is assumed that N=25, M=2, the preset wear threshold is 70%, and the first wear threshold is 1%.

The controller detects that degrees of wear of two storage devices in the storage array formed by 25 storage devices exceed 70%, and starting from a storage device with a maximum degree of wear, calculation of the difference $\Delta T$ between the degrees of wear is performed. $T_i$ indicates a degree of wear of the $i^{th}$ storage device after the sequencing. First, a difference between degrees of wear is calculated from a $1^{st}$ storage device and a $2^{nd}$ storage device after the sequencing, and $\Delta T_1 = T_1 - T_2 = 80.01\% - 70.01\% = 10\%$. Because 10% is greater than 1%, step 304 is performed.

In Table 1 as shown in FIG. 13, an actual slot number in the first row is an actual physical number of a storage device in the storage array; i in the second row is a logical number of each storage device sequenced according to the degrees of wear in descending order; and T in the third row is a degree of wear of each storage device.

Step 303: Take the $1^{st}$ to the $i^{th}$ storage devices as the first storage device subset, and take the $(i+1)^{th}$ to the $N^{th}$ storage devices as the second storage device subset.

Step 304: Add 1 to i, and continue to calculate a difference between degrees of wear of an $i^{th}$ storage device and an $(i+1)^{th}$ storage device until a difference between degrees of wear is smaller than or equal to the first wear threshold or all the N storage devices are traversed.

In the example shown in Table 1, because the difference between the degrees of wear of the $1^{st}$ storage device and the $2^{nd}$ storage device after the sequencing is greater than the first wear threshold, i plus 1 equals 2, and calculation of a difference between degrees of wear of the $2^{nd}$ storage device and a $3^{rd}$ storage device is started. $\Delta T_2 = T_2 - T_3 = 70.01\% - 65.20\% = 4.81\%$. Because 4.81% is greater than 1%, calculation is continued after i plus 1 equals 3. In this case, calculation of a difference between degrees of wear of the $3^{rd}$ storage device and a $4^{th}$ storage device is started. $\Delta T_3 = T_3 - T_4 = 65.20\% - 65.17\% = 0.03\%$. Because 0.03% is smaller than 1%, no calculation of a difference between degrees of wear of storage devices sequenced after the $4^{th}$ storage device is continued, and the traversal ends.

In this case, the $1^{st}$ to the $i^{th}$ storage devices are taken as the first storage device subset, and the $(i+1)^{th}$ to the $N^{th}$ storage devices are taken as the second storage device subset. In the example shown in Table 1, the $1^{st}$ to the $3^{rd}$ storage devices are taken as the first storage device subset subset1, and the $4^{th}$ to a $25^{th}$ storage devices are taken as the second storage device subset subset2.

The first storage device subset and the second storage device subset are obtained through division in the preceding step 303 or 304. A characteristic of the first storage device subset is that: differences between degrees of wear of all storage devices exceed the first wear threshold. A characteristic of the second storage device subset is that: a difference between a degree of wear of a storage device with the maximum degree of wear in the second storage device subset and that of a storage device with the minimum degree of wear in the first storage device subset does not exceed the first wear threshold.

For example, in the example shown in Table 1, differences between degrees of wear of all storage devices in the first storage device subset subset1 exceed 1%, and the difference between the degree of wear of the storage device with the maximum degree of wear (the $4^{th}$ storage device after the sequencing) in the second storage device subset subset2 and that of the storage device with the minimum degree of wear (the $3^{rd}$ storage device after the sequencing) in the first storage device subset subset1 does not exceed 1%.

Generally, degrees of wear of all storage devices in a same storage array should be close to each other. For example, a difference between degrees of wear at a same time point does not exceed 2%. Table 1 shows a case in which a difference between degrees of wear is relatively large, which may be caused by replacing a storage device of an individual slot for a certain reason or adding a new storage device into the storage array when the storage array is in use.

If no difference of degrees of wear between the $i^{th}$ storage device and the $(i+1)^{th}$ storage device that is smaller than or equal to the first wear threshold is found even after the traversal of the N storage devices ends, distribution of service data (data for short) is re-adjusted according to a weight of each storage device, thereby achieving even distribution according to weights. That is to say, after the differences between the degrees of wear of the storage devices in the first storage device subset and those between the degrees of wear of the storage devices in the second storage device subset are widened, an even state is restored again. Then, after a period of time (for example, one week), the process is restarted from Step 102.

In the preceding method, it is assumed that the number of storage devices in the first storage device subset is X, and the number of storage devices in the second storage device subset is N−X. The following describes a specific method for migrating data from the second storage device subset to the first storage device subset. Certainly, a migration method is not limited to that described in the following embodiment.

Step 305: Collect statistics about a free storage space in the first storage device subset; that is, collect statistics about how many Chunks are still in an idle (unused) state in total in the first storage device subset. If a RAID group is established, it may be understood that a Chunk that has not been used to establish the RAID group is in the idle state. It is assumed that a statistical result is represented by FreeSize.

Step 306: Taking that storage devices are SSDs as an example for description, averagely extract data from FreeSize/(N−X) logical SSDs of each physical SSD in the second storage device subset, and migrate the data to physical SSDs in the first storage device subset, thereby making each physical SSD in the first storage device subset to operate in a fully loaded manner. It may be understood that a fully loaded operation is that every Chunk of a storage device is occupied and no space is reserved for hot backup. In this way, after a period of time, degrees of wear of all physical SSDs in the first storage device subset is higher than those of all physical SSDs in the second storage device subset due to a difference between service burdens.

Certainly, a data migration method described in another embodiment may also be used.

In addition, if it is expected that a difference between a minimum degree of wear of a physical SSD in the first storage device subset and a maximum degree of wear of a physical SSD in the second storage device subset is widened rapidly, more data may further be extracted from the physical SSD with the maximum degree of wear in the second storage device subset into a physical SSD in the first storage device subset.

For example, in the example shown in Table 1, there are 3 storage devices in the first storage device subset, and there are 25−3=22 storage devices in the second storage device subset. Service data may be averagely extracted from FreeSize/22 logical SSDs and migrated to the 3 storage devices in the first storage device subset. To rapidly widen a difference between degrees of wear of SSDs with actual slot numbers 14 and 7, more service data with the actual slot number 7 may be extracted (for example, service data of 1 to 2 more Chunks is extracted) and migrated to the 3 storage devices in the first storage device subset.

If a RAID is formed, when data in the second storage device subset is migrated to the first storage device subset, it is required that an SSD that is in the first storage device subset and to which the data is migrated is different from an SSD that is in the first storage device subset and included in the RAID. The objective is to ensure that each Chunk included in a RAID belongs to a different disk, thereby avoiding a case in which data of two CKs are lost due to a failure or power outage of a disk.

Because the service burden is gradually migrated, service performance of a whole system is not affected.

After Step 306 is performed, the method in FIG. 6 may further include:

Step 308 (not shown FIG. 6): After a certain time interval, if it is found through calculation that a difference between a minimum degree of wear of a physical SSD in the first storage device subset and a maximum degree of wear of a physical SSD in the second storage device subset is already greater than or equal to the first wear threshold, restart to perform step 102.

A method shown in FIG. 7 may also be used to describe how to divide the storage array into a first storage device subset and a second storage device subset according to the degrees of wear of the N storage devices and how to migrate data from the second storage device subset to the first storage device subset.

As shown in FIG. 7, the following steps are included:

Step 401: Group the N storage devices into S subsections according to the degrees of wear of the N storage devices, where a minimum degree of wear of a storage device in a $j^{th}$ subsection is greater than or equal to a maximum degree of wear of a storage device in a $(j+1)^{th}$ subsection, and $0<j<S$.

Preferably, differences between degrees of wear of storage devices in each subsection all exceed a second wear threshold. For determining of the second wear threshold, reference may be made to the first wear threshold, and the second wear threshold may be the same as or different from the first wear threshold. In addition, a difference between a degree of wear of a storage device with the maximum degree of wear in the $(j+1)^{th}$ subsection and that of a storage device with the minimum degree of wear in the $j^{th}$ subsection does not exceed the second wear threshold.

A method for grouping into S subsections may be as follows:

Step 4020 (not shown in FIG. 7): Sequence the N storage devices according to the degrees of wear in descending order, where a storage device with a maximum degree of wear is numbered 1, and a storage device with a minimum degree of wear is numbered N.

Step 4021 (not shown in FIG. 7): Calculate a difference $\Delta T$ between degrees of wear of an $i^{th}$ storage device and an $(i+1)^{th}$ storage device, where $0<i<N$; start the calculation of the difference $\Delta T$ between the degrees of wear first from the $i^{th}$ storage device, where $i=1$; when the difference between the degrees of wear is smaller than or equal to the second wear threshold, perform Step 4022; and when the difference between the degrees of wear is greater than the second wear threshold, perform Step 4023.

For a method for determining the second wear threshold, reference may be made to a description of the embodiment of FIG. 6.

Step 4022 (not shown in FIG. 7): Group the $i^{th}$ storage device into one subsection, and group the $(i+1)^{th}$ storage device into another subsection; then add 1 to i, and continue to perform Step 4021.

Step 4023 (not shown in FIG. 7): Group the $(i+1)^{th}$ storage device into a subsection to which the $i^{th}$ storage device belongs; then add 1 to i, and continue to perform Step 4021.

The storage array is divided into S subsections by using the preceding method.

Table 2, as shown in FIG. 14, is taken as an example for description: it is assumed that $N=25$, $M=2$, a preset wear threshold is 70%, and the second wear threshold is the same as the first wear threshold, that is, 1%.

First, calculation of a difference between degrees of wear is performed first from a $1^{st}$ storage device and a $2^{nd}$ storage device after the sequencing, and $\Delta T)=T_1-T_2=80.01\%-70.01\%=10\%$. Because 10% is greater than 1%, step 4023 is performed. The $2^{nd}$ storage device and the $1^{st}$ storage device are grouped into a same subsection, and then a $1^{st}$ subsection subsection) is $\{1,2\}$. Then, i plus 1 equals 2, and calculation of a difference between degrees of wear of the $2^{nd}$ storage device and a $3^{rd}$ storage device is started. $\Delta T_2=T_2-T_3=70.01\%-65.20\%=4.81\%$. Because 4.81% is greater than 1%, the $3^{rd}$ storage device and $2^{nd}$ storage device are grouped into a same subsection, and then a $1^{st}$ subsection subsection1 is $\{1, 2, 3\}$. Then, calculation of a difference between degrees of wear of the $3^{rd}$ storage device and a $4^{th}$ storage device is started. $\Delta T_3=T_3-T_4=65.20\%-65.17\%=0.03\%$. Because 0.03% is smaller than 1%, the $4^{th}$ storage device is grouped into a $2^{nd}$ subsection. Then, i plus 1 equals 4, and calculation of a difference between degrees of wear of the $4^{th}$ storage device and a $5^{th}$ storage device is started. $\Delta T_4=T_4-T_5=65.17\%-64.16\%=1.01\%$. Because 1.01% is greater than 1%, the $5^{th}$ storage device and the $4^{th}$ storage device are grouped into a same subsection, and then a $2^{nd}$ subsection subsection2 is $\{4, 5\}$. Then, calculation of a difference between degrees of wear of the $5^{th}$ storage device and a $6^{th}$ storage device is started. $\Delta T_5=T_5-T_6=64.16\%-64.00\%=0.16\%$. Because 0.16% is smaller than 1%, the $6^{th}$ storage device is grouped into a $3^{rd}$ subsection subsection3. Then, calculation of a difference between degrees of wear of the $6^{th}$ storage device and a $7^{th}$ storage device is started until all storage devices are traversed.

Step 402: Calculate the number of storage devices in the $1^{st}$ subsection to the $j^{th}$ subsection, where $0<j<S$; if $j=1$, directly calculate the number of storage devices in the $1^{st}$ subsection;

when the number of the storage devices in the $1^{st}$ subsection to the $j^{th}$ subsection is greater than or equal to N/2, perform Step 403; and when the number of the storage devices in the $1^{st}$ subsection to the $j^{th}$ subsection is smaller than N/2, perform Step 404.

Step 403: Take the storage devices in the $1^{st}$ subsection to the $j^{th}$ subsection as a first storage device subset, and take the storage devices in the $(j+1)^{th}$ subsection to an $S^{th}$ subsection as a second storage device subset.

Step 404: Then, add 1 to j, and continue to calculate the number of storage devices in the $1^{st}$ subsection to a $j^{th}$ subsection until the number of the storage devices in the $1^{st}$ subsection to the $j^{th}$ subsection is greater than or equal to N/2, take the storage devices in the $1^{st}$ subsection to the $j^{th}$ subsection as the first storage device subset, and take the storage devices in a $(j+1)^{th}$ subsection to the $S^{th}$ subsection as the second storage device subset.

When data in the second storage device subset is migrated to the first storage device subset, an amount of data added to each subsection in the first storage device subset is equal or starts to decrease progressively from the $1^{st}$ subsection, and an amount of data extracted from each subsection in the second storage device subset is equal or starts to decrease progressively from the $S^{th}$ subsection. A specific method may be as follows:

Step 405: Collect statistics about a free storage space in the first storage device subset; that is, collect statistics about how many Chunks are still in an idle (unused) state in total in the first storage device subset. If a RAID group is established, it may be understood that a Chunk that has not been used to establish the RAID group is in the idle state. It is assumed that a statistical result is represented by FreeSize.

It is assumed that the number of storage devices in the first storage device subset is X and the number of storage devices in the second storage device subset is N−X. An average free space of all storage devices in the first storage device subset is FreeSize/X.

Step 406: The first subset includes j subsections. It is assumed that data of FreeSize−FreeSizeA in total in the second subset is migrated to the first subset, where FreeSizeA indicates a free storage space in the first subset after the data migration, and data of (FreeSize−FreeSizeA)/(N−X) is extracted from each storage device in the second subset and migrated to the first subset.

After the data migration, a free storage space of each subsection in the first subset is:

FreeSize/X*(u−1), where 1≤u≤j.

For example, the first subset includes three subsections, and after the data migration:

a free space of each storage device in the $1^{st}$ subsection is adjusted to (FreeSize/X)*(1−1)=0;

a free space of each storage device in the $2^{nd}$ subsection is adjusted to (FreeSize/X)*(2−1)=FreeSize/X; and a free space of each storage device in the $3^{rd}$ subsection is adjusted to (FreeSize/X)*(3−1)=2*FreeSize/X.

After the data migration, free storage spaces of all subsections in the first subset total FreeSizeA.

Certainly, a data migration method described in another embodiment may also be used.

A method shown in FIG. 8 may also be used to describe how to divide the storage array into a first storage device subset and a second storage device subset according to the degrees of wear of the N storage devices and how to migrate data from the second storage device subset to the first storage device subset.

Step 501 is the same as Step 401, and is not repeatedly described herein.

Step 502: j=⌊S/2⌋, indicating rounding S/2 down, take storage devices in a $1^{st}$ subsection to the $j^{th}$ subsection as a first storage device subset, and take storage devices in the $(j+1)^{th}$ subsection to an $S^{th}$ subsection as a second storage device subset.

Table 2 is still taken as an example for description. It is assumed that S=5, j=⌊S/2⌋=2 is used, storage devices in the $1^{st}$ subsection and a $2^{nd}$ subsection are taken as the first storage device subset, and storage devices in a $3^{rd}$ subsection to a $5^{th}$ subsection are taken as the second storage device subset.

Alternatively, j=⌈S/2⌉, indicating rounding S/2 up, take storage devices in the $1^{st}$ subsection to the $j^{th}$ subsection as the first storage device subset, and take storage devices in the $(j+1)^{th}$ subsection to the $S^{th}$ subsection as the second storage device subset.

Accordingly, a specific method for migrating data from the second storage device subset to the first storage device subset may be as follows:

Step 505: Collect statistics about a free storage space in the first storage device subset; that is, collect statistics about how many Chunks are still in an idle (unused) state in total in the first storage device subset. If a RAID group is established, it may be understood that a Chunk that has not been used to establish the RAID group is in the idle state. It is assumed that a statistical result is represented by FreeSize.

It is assumed that the number of storage devices in the first storage device subset is X and the number of storage devices in the second storage device subset is N−X.

Step 506: The first subset includes j subsections. It is assumed that data of FreeSize−FreeSizeA in total in the second subset is migrated to the first subset, where FreeSizeA indicates a free storage space in the first subset after the data migration, and service data of (FreeSize−FreeSizeA)/(N−X) is extracted from each storage device in the second subset and migrated to the storage devices in the first subset.

An uneven migration solution may also be used to migrate data from the second storage device subset to the first storage device subset; that is, service data added to each subsection in the first subset starts to decrease progressively from the $1^{st}$ subsection, and service data extracted from each subsection in the second subset starts to decrease progressively from the $S^{th}$ subsection.

Table 2 is taken as an example for description. Under a precondition that service data migrated out of the second storage device subset equals that migrated into the first storage device subset: if storage devices in the $1^{st}$ subsection and the $2^{nd}$ subsection are taken as the first storage device subset, service data in the $1^{st}$ subsection is increased by 100% (that is, all free spaces are occupied), and service data in the $2^{nd}$ subsection is increased by 90% (that is, only 90% of all free spaces are occupied); and if storage devices in the $3^{rd}$ subsection to the $5^{th}$ subsection are taken as the second storage device subset, in the second storage device subset, service data in the $5^{th}$ subsection is reduced by 30% (30% of all data is reduced), service data in a $4^{th}$ subsection is reduced by 20% (20% of all data is reduced), and service data in the $3^{rd}$ subsection is reduced by 10% (10% of all data is reduced).

Certainly, a data migration method described in another embodiment may also be used.

Certainly, a method for how to divide the storage array into a first storage device subset and a second storage device subset according to the degrees of wear of the N storage devices is not limited to that shown in FIG. 6, FIG. 7, or FIG. 8. For example, a third wear threshold may be set; and after degrees of wear are sequenced, storage devices whose degrees of wear are greater than or equal to the third wear threshold form the first storage device subset, and storage devices whose degrees of wear are smaller than the third wear threshold form the second storage device subset. The third wear threshold may be preset according to an empirical value and adjusted, and may be the same as or different from the preset wear threshold described in the preceding embodiment.

In this embodiment of the present invention, a storage array is divided into a first storage device subset and a second storage device subset according to degrees of wear of storage devices, where a minimum degree of wear of a storage device in the first storage device subset is greater than or equal to a maximum degree of wear of a storage device in the second storage device subset, and then, data in the second storage device subset is migrated to the first storage device subset or to-be-written data is written into the first storage device subset. Therefore, service lives of storage devices in the second storage device subset may be extended relatively by shortening service lives of storage devices in the first storage device subset, thereby widening an interval between time when a storage device in the first storage device subset fails and time when a storage device in the second storage device subset fails, reducing a risk that multiple storage devices fail concurrently due to wear leveling, and improving data reliability.

All introduced in the foregoing are methods for dynamic adjustment. Certainly, if each storage device in the storage array is allocated a weight directly and capacities of all storage devices are the same, a different weight may be allocated to each storage device to ensure that a weight value of each storage device is different.

Alternatively, when each storage device in the storage array is allocated the weight, it is ensured that capacities of all storage devices are different. However, a same weight is allocated to each storage device. This makes degrees of wear of all storage devices uneven.

The method for global anti-wear leveling can be implemented on various data protection models (including but not limited to: no data protection, mirror-based data protection, parity-based data protection, and the like) in the present invention, and that storage devices are SSDs is taken as an example for description.

The following takes parity-based data protection as an example for description, for example, a RAID 5 or a RAID 6.

Figure 9:
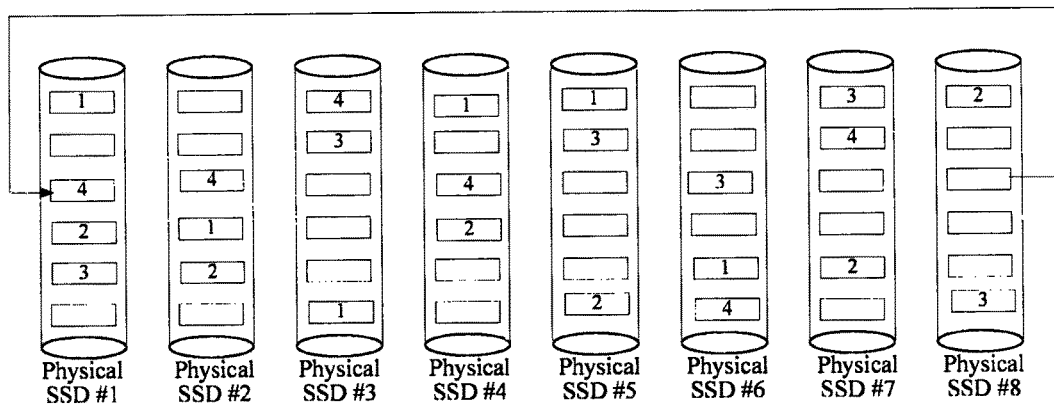
FIG. 9 is a schematic diagram of an application scenario according to an embodiment of the present invention.

When physical SSDs in the SSD group all wear to a certain extent, the system selects some physical SSDs from the physical SSDs to bear more services, and accordingly, service volumes borne on other physical SSDs consequentially decrease. For example, in a RAID 5 system shown in FIG. 3 and FIG. 9, data is migrated from a $4^{th}$ logical SSD of a physical SSD #8 to a logical SSD of a physical SSD #1.

Through the preceding steps, the physical SSD #1 bears a larger volume of services and wears at a higher speed, while the physical SSD #8 bears a smaller volume of services and wears at a lower speed. After a period of time, degrees of wear of all physical SSDs form a staircase shape similar to that shown in FIG. 5, thereby preventing multiple physical SSDs from failing concurrently, and improving system reliability.

The following further takes implementation in a mirror-based data model as an example for description, for example, a RAID 1 or a RAID 10.

Figure 10:
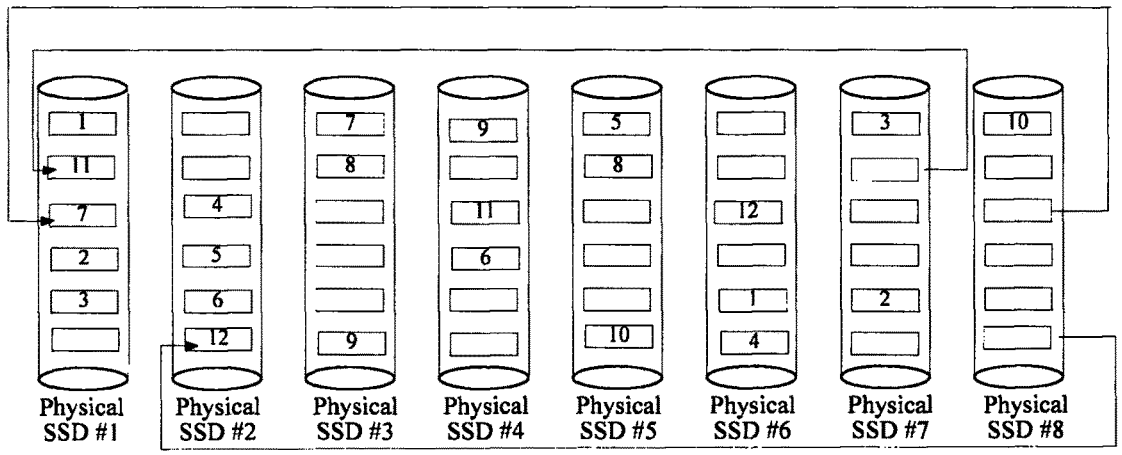
FIG. 10 is a schematic diagram of another application scenario according to an embodiment of the present invention.

When physical SSDs in the SSD group all wear to a certain extent, the system selects some physical SSDs from the physical SSDs to bear more services, and accordingly, service volumes borne on other physical SSDs consequentially decrease. For example, in a RAID 1 system shown in FIG. 10, data is migrated from some logical SSDs of physical SSDs #7 and #8 to logical SSDs of a physical SSD #1 and a physical SSD #2.

Through the preceding steps, the physical SSD #1 and the physical SSD #2 bear a larger volume of services and wear at a higher speed, while the physical SSDs #7 and #8 bear a smaller volume of services (where a volume of services borne by #8 becomes much smaller than that borne by #7) and wear at a lower speed. After a period of time, degrees of wear of all physical SSDs form a staircase shape similar to that shown in FIG. 5, thereby preventing multiple physical SSDs from failing concurrently, and improving system reliability.

The preceding procedure describes various scenarios where this embodiment of the present invention applies, and certainly, the present invention is not limited to these scenarios.

Apparatus in an Embodiment of the Present Invention

Figure 11:
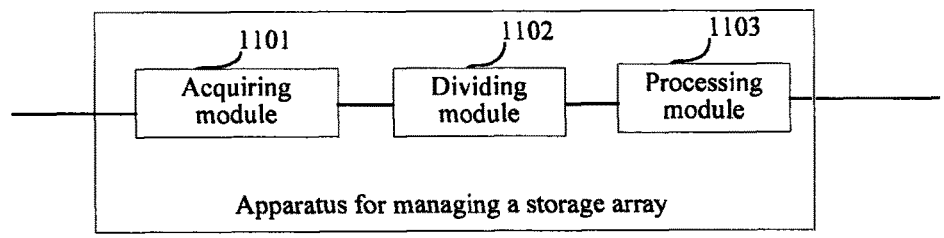
FIG. 11 is a schematic structural diagram of an apparatus for managing a storage array according to an embodiment of the present invention.

This embodiment of the present invention provides an apparatus for managing a storage array. The storage array is formed by N storage devices, and as shown in FIG. 11, the apparatus includes: an acquiring module 1101 configured to acquire degrees of wear of the N storage devices; a dividing module 1102 configured to divide the storage array into a first storage device subset and a second storage device subset according to the degrees of wear of the N storage devices, where a minimum degree of wear of a storage device in the first storage device subset is greater than or equal to a maximum degree of wear of a storage device in the second storage device subset; and a processing module 1103 configured to migrate data from the second storage device subset to the first storage device subset, or write to-be-written data into the first storage device subset.

The dividing module 1102 is configured to: sequence the N storage devices according to the degrees of wear in descending order, where a storage device with a maximum degree of wear is numbered 1, and a storage device with a minimum degree of wear is numbered N; calculate a difference between degrees of wear of an $i^{th}$ storage device and an $(i+1)^{th}$ storage device, where $0<i<N$; when the difference between the degrees of wear is smaller than or equal to a first wear threshold, take a $1^{st}$ to the $i^{th}$ storage devices as the first storage device subset, and take the $(i+1)^{th}$ to an $N^{th}$ storage devices as the second storage device subset; and when the difference between the degrees of wear is greater than the first wear threshold, add 1 to i, and continue to calculate a difference between degrees of wear of an $i^{th}$ storage device and an $(i+1)^{th}$ storage device.

Alternatively, the dividing module 1102 is configured to: group the N storage devices into S subsections according to the degrees of wear of the N storage devices, where a minimum degree of wear of a storage device in a $i^{th}$ subsection is greater than or equal to a maximum degree of wear of a storage device in a $(j+1)^{th}$ subsection, and $0<j<S$; calculate the number of storage devices in a $1^{st}$ subsection to the $j^{th}$ subsection, where $0<j<S$; when the number of the storage devices in the $1^{st}$ subsection to the $j^{th}$ subsection is greater than or equal to N/2, take the storage devices in the $1^{st}$ subsection to the $j^{th}$ subsection as the first storage device subset, and take storage devices in the $(j+1)^{th}$ subsection to an $S^{th}$ subsection as the second storage device subset; and when the number of the storage devices in the $1^{st}$ subsection to the $j^{th}$ subsection is smaller than N/2, add 1 to j, and continue to calculate the number of storage devices in the $1^{st}$ subsection to a $j^{th}$ subsection.

Alternatively, the dividing module 1102 is configured to: group the N storage devices into S subsections according to the degrees of wear of the N storage devices, where a minimum degree of wear of a storage device in a $j^{th}$ subsection is greater than or equal to a maximum degree of wear of a storage device in a $(j+1)^{th}$ subsection, and $0<j<S$; and take storage devices in a $1^{st}$ subsection to the $j^{th}$ subsection as the first storage device subset, and take storage devices in the $(j+1)^{th}$ subsection to an $S^{th}$ subsection as the second storage device subset, where $j=\lfloor S/2 \rfloor$, indicating rounding S/2 down, or $j=\lceil S/2 \rceil$, indicating rounding S/2 up.

Alternatively, the dividing module 1102 is configured to: form the first storage device subset with storage devices whose degrees of wear are greater than or equal to a third wear threshold, and form the second storage device subset with storage devices whose degrees of wear are smaller than the third wear threshold. Accordingly, the processing module 1103 is configured to: collect statistics about a free storage space FreeSize in the first storage device subset; and extract data of FreeSize/(N−i) from each storage device in the second storage device subset, and migrate data to the first storage device subset, where i indicates the number of storage devices in the first storage device subset.

Preferably, an amount of data added to each subsection in the first storage device subset is equal or starts to decrease progressively from the 1st subsection; and an amount of data extracted from each subsection in the second storage device subset is equal or starts to decrease progressively from the Sth subsection.

The processing module 1103 is configured to, when the amount of data extracted from each subsection in the second storage device subset is equal, extract data of (FreeSize−FreeSizeA)/(N−X) from each storage device in the second storage device subset and migrate data to the first storage device subset, where FreeSize indicates a free storage space in the first storage device subset before the data migration, FreeSizeA indicates a free storage space in the first storage device subset after the data migration, and X indicates the number of storage devices in the first storage device subset.

In another embodiment, the apparatus further includes a comparing module (not shown in FIG. 11) configured to compare degrees of wear of storage devices in the second storage device subset with a fourth wear threshold; and if a degree of wear of at least one storage device in the second storage device subset is greater than or equal to the fourth wear threshold, the processing module migrates the data from the second storage device subset to the first storage device subset.

The apparatus provided in this embodiment of the present invention may be disposed in the controller described in the preceding embodiment and is configured to perform the method for managing a storage array described in the preceding embodiment. For a detailed description about functions of each unit, reference may be made to the description in the method embodiment, and details are not repeatedly described herein.

Figure 12:
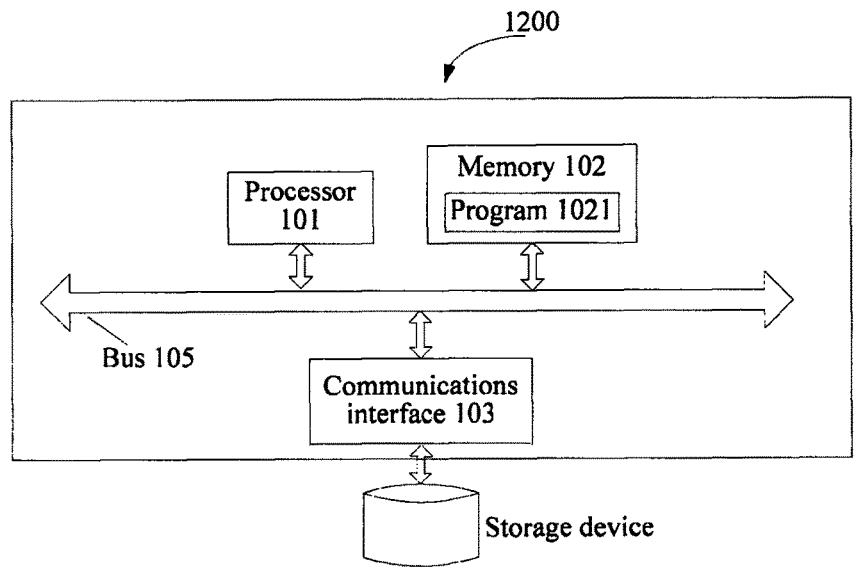
FIG. 12 is a schematic structural diagram of a controller according to an embodiment of the present invention.

As shown in FIG. 12, a controller 1200 provided in an embodiment of the present invention includes: a processor 101, a memory 102, a system bus (a bus for short) 105, and a communications interface 103, where the processor 101, the memory 102, and the communications interface 103 connect to and communicate with each other through the system bus 105.

The processor 101 may be a single-core or multi-core central processing unit or a specific integrated circuit, or may be configured to one or more integrated circuits implementing this embodiment of the present invention.

The memory 102 may be a high-speed random access memory (RAM) or a non-volatile memory, for example, at least one disk memory.

The communications interface 103 is configured to communicate with a storage device.

The memory 102 is configured to store a computer execution instruction 1021. The computer execution instruction 1021 may include a program code.

When a computer is running, the processor 101 runs the computer execution instruction 1021 and may perform any one of the method processes according to FIG. 4 to FIG. 10.

An embodiment of the present invention further provides a computer program product for data processing, including a computer-readable storage medium that stores a program code, where an instruction included in the program code is used to perform any one of the method processes according to FIG. 4 to FIG. 10.

In this embodiment of the present invention, a storage array is divided into a first storage device subset and a second storage device subset according to degrees of wear of storage devices, where a minimum degree of wear of a storage device in the first storage device subset is greater than or equal to a maximum degree of wear of a storage device in the second storage device subset, and then, data in the second storage device subset is migrated to the first storage device subset or to-be-written data is written into the first storage device subset. Therefore, service lives of storage devices in the second storage device subset may be extended relatively by shortening service lives of storage devices in the first storage device subset, thereby widening an interval between time when a storage device in the first storage device subset fails and time when a storage device in the second storage device subset fails, reducing a risk that multiple storage devices fail concurrently due to wear leveling, and improving data reliability.

A person of ordinary skill in the art may understand that each aspect of the present invention or possible implementation manners of each aspect may be specifically implemented as a system, a method, or a computer program product. Therefore, each aspect of the present invention or possible implementation manners of each aspect may use a form of a complete hardware embodiment, a complete software embodiment (including firmware, resident software, and the like), or an embodiment combined with software and hardware, and they are collectively called "circuit", "module", or "system" herein. In addition, each aspect of the present invention or possible implementation manners of each aspect may use a form of a computer program product. The computer program product refers to a computer-readable program code stored in a computer-readable medium.

The computer-readable medium may be a computer-readable signal medium or a computer-readable storage medium. The computer-readable storage medium includes, but is not limited to, an electronic, a magnetic, an optical, an electromagnetic, an infrared, or a semi-conductive system, device, or apparatus, or any appropriate combination of the foregoing, such as RAM, a read-only memory (ROM), an erasable programmable read-only memory (EPROM or flash memory), an optical fiber, or a portable read-only memory (CD-ROM).

A processor of a computer reads the computer-readable program code stored in the computer-readable medium, so that the processor can execute function actions specified in each step or a combination of steps in a flowchart; and generates an apparatus to implement function actions specified in each block or a combination of blocks in a block diagram.

The computer-readable program code may be completely executed on a computer of a user, partially executed on a computer of a user, function as an independent software package, partially executed on a computer of a user and partially executed on a remote computer, or completely executed on a remote computer or a server. It should also be noted that, in some alternative implementation solutions, functions indicated in each step of the flowchart or in each block of the block diagram may not occur in a sequence indicated in the flowchart or the diagram. For example, depending on involved functions, two steps or two blocks shown one after another may be actually executed at nearly the same time, or sometimes, the blocks are executed in a converse sequence.

A person of ordinary skill in the art may be aware that, units and algorithm steps of each example described in combination with the embodiments disclosed herein may be implemented by electronic hardware, or a combination of computer software and electronic hardware. Whether the functions are performed in a hardware or software manner depends on particular applications and design constraint conditions of the technical solutions. A person skilled in the art may use different methods to implement the described functions for each particular application, but it should not be considered that the implementation goes beyond the scope of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method implemented by a controller for managing a storage array formed by N physical storage devices, wherein N>=2, the method comprising:
   acquiring degrees of wear of the N physical storage devices, each physical storage device having a degree of wear;
   dividing the N physical storage devices of the storage array into a first subset of physical storage devices and a second subset of physical storage devices, such that a degree of wear of each storage device in the first subset of physical storage devices is greater than or equal to a degree of wear of any storage device in the second subset of physical storage devices; and
   writing to-be-written data into the physical storage devices in the first subset.

2. The method according to claim 1, wherein dividing the storage array into the first subset and the second subset comprises:
   sequencing the N physical storage devices according to the degrees of wear of the N physical storage devices in descending order, wherein a storage device with a maximum degree of wear is numbered 1, and wherein a physical storage device with a minimum degree of wear is numbered N;
   calculating a difference between degrees of wear of an $i^{th}$ physical storage device and an $(i+1)^{th}$ physical storage device, wherein $0<i<N$;
   taking a $1^{st}$ to the $i^{th}$ physical storage devices as the first subset and the $(i+1)^{th}$ to an $N^{th}$ physical storage devices as the second subset when the difference between the degrees of wear of the $i^{th}$ physical storage device and the $(i+1)^{th}$ physical storage device is smaller than or equal to a first wear threshold;
   adding 1 to i; and
   continuing to calculate a difference between degrees of wear of an $i^{th}$ physical storage device and an $(i+1)^{th}$ physical storage device when the difference between the degrees of wear of the $i^{th}$ physical storage device and the $(i+1)^{th}$ physical storage device is greater than the first wear threshold.

3. The method according to claim 1, wherein dividing the storage array into the first subset and the second subset comprises:
   grouping the N physical storage devices into S subsections, such that a degree of wear of each of storage device in a $j^{th}$ subsection are greater than or equal to a degree of wear of any storage devices in an $(j+1)^{th}$ subsection, and $0<j<S$;
   calculating the number of physical storage devices in a $1^{st}$ subsection to the $j^{th}$ subsection;
   taking the physical storage devices in the $1^{st}$ subsection to the $j^{th}$ subsection as the first subset and the physical storage devices in the $(j+1)^{th}$ subsection to an $S^{th}$ subsection as the second subset when the number of the physical storage devices in the $1^{st}$ subsection to the $j^{th}$ subsection is greater than or equal to N/2;
   adding 1 to j; and
   continuing to calculate the number of physical storage devices in the $1^{st}$ subsection to a $j^{th}$ subsection when the number of the physical storage devices in the $1^{st}$ subsection to the $j^{th}$ subsection is smaller than N/2.

4. The method according to claim 1, wherein dividing the storage array into the first subset and the second subset comprises:
   grouping the N physical storage devices into S subsections, such that a degree of wear of physical storage device in a $j^{th}$ subsection are greater than or equal to a degree of wear of any physical storage devices in an $(j+1)^{th}$ subsection, and $0<j<S$; and
   taking the physical storage devices in a $1^{st}$ subsection to the $j^{th}$ subsection as the first subset and the physical storage devices in the $(j+1)^{th}$ subsection to an $S^{th}$ subsection as the second subset,
   wherein $j=\lfloor S/2 \rfloor$, indicating rounding S/2 down, or wherein $j=\lceil S/2 \rceil$, indicating rounding S/2 up.

5. The method according to claim 3, wherein grouping the N storage devices into S subsections comprises:
   sequencing the N physical storage devices according to the degrees of wear of the N physical storage devices in descending order, wherein a physical storage device with a maximum degree of wear is numbered 1, and wherein a physical storage device with a minimum degree of wear is numbered N;
   calculating a difference between degrees of wear of an $i^{th}$ physical storage device and an $(i+1)^{th}$ physical storage device, wherein $0<i<N$;
   when the difference between the degrees of wear of the $i^{th}$ physical storage device and the $(i+1)^{th}$ physical storage device is smaller than or equal to a second wear threshold, grouping the $i^{th}$ physical storage device into one subsection, grouping the $(i+1)^{th}$ physical storage device into another subsection, adding 1 to i, and continuing to calculate a difference between degrees of wear of an $i^{th}$ physical storage device and an $(i+1)^{th}$ physical storage device; and
   when the difference between the degrees of wear of the $i^{th}$ physical storage device and the $(i+1)^{th}$ physical storage device is greater than the second wear threshold, grouping the $(i+1)^{th}$ physical storage device into a subsection to which the $i^{th}$ physical storage device belongs, adding 1 to i, and continuing to calculate a difference between degrees of wear of an $i^{th}$ physical storage device and an $(i+1)^{th}$ physical storage device.

6. The method according to claim 1, wherein dividing the storage array into the first subset and the second subset comprises:
   forming the first subset with physical storage devices whose degrees of wear are greater than or equal to a first wear threshold; and
   forming the second subset with physical storage devices whose degrees of wear are smaller than the first wear threshold.

7. A controller of a storage array having N physical storage devices, wherein N>=2, comprising:
   a memory configured to store computer-executable instructions,
   a communications interface;
   a processor coupled to the memory and the communications interface via a system bus, wherein the processor is configured to communicate with the storage array through the communication interface, and to execute the computer-executable instructions to perform operations of:
   acquiring degrees of wear of the N physical storage devices of the storage array, each physical storage device having a degree of wear;

dividing the N physical storage devices of the storage array into a first subset of physical storage devices and a second subset of physical storage devices, such that a degree of wear of each of physical storage device in the first subset of physical storage devices is greater than or equal to a degree of wear of any physical storage device in the second subset of physical storage devices; and writing to-be-written data into the physical storage devices in the first subset.

8. The controller according to claim 7, wherein dividing the storage array into the first subset and the second subset comprises:

sequencing the N physical storage devices according to the degrees of wear of the N storage devices in descending order, wherein a physical storage device with a maximum degree of wear is numbered 1, and wherein a physical storage device with a minimum degree of wear is numbered N;

calculating a difference between degrees of wear of an $i^{th}$ physical storage device and an $(i+1)^{th}$ physical storage device, wherein $0<i<N$;

taking a $1^{st}$ to the $i^{th}$ physical storage devices as the first subset and the $(i+1)^{th}$ to an $N^{th}$ physical storage devices as the second subset when the difference between the degrees of wear of the $i^{th}$ physical storage device and the $(i+1)^{th}$ physical storage device is smaller than or equal to a first wear threshold;

adding 1 to i; and continuing to calculate a difference between degrees of wear of an $i^{th}$ physical storage device and an $(i+1)^{th}$ physical storage device when the difference between the degrees of wear of the $i^{th}$ physical storage device and the $(i+1)^{th}$ physical storage device is greater than the first wear threshold.

9. The controller according to claim 7, wherein dividing the storage array into the first subset and the second subset comprises:

grouping the N physical storage devices into S subsections, such that a degree of wear of each of physical storage devices in a $j^{th}$ subsection is greater than or equal to a degree of wear of any storage device in an $(j+1)^{th}$ subsection, and $0<j<S$;

calculating the number of physical storage devices in a $1^{st}$ subsection to the $j^{th}$ subsection;

taking the physical storage devices in the $1^{st}$ subsection to the $j^{th}$ subsection as the first subset and the physical storage devices in the $(j+1)^{th}$ subsection to an $S^{th}$ subsection as the second subset when the number of the physical storage devices in the $1^{st}$ subsection to the $j^{th}$ subsection is greater than or equal to N/2;

adding 1 to j; and continuing to calculate the number of physical storage devices in the $1^{st}$ subsection to a $j^{th}$ subsection when the number of the physical storage devices in the $1^{st}$ subsection to the $j^{th}$ subsection is smaller than N/2.

10. The controller according to claim 7, wherein dividing the storage array into the first subset and the second subset comprises:

grouping the N physical storage devices into S subsections, such that a degree of wear of each of physical storage device in a $j^{th}$ subsection is greater than or equal to a degree of wear of any physical storage device in an $(j+1)^{th}$ subsection, and $0<j<S$; and taking the physical storage devices in a $1^{st}$ subsection to the $j^{th}$ subsection as the first subset and the physical storage devices in the $(j+1)^{th}$ subsection to an $S^{th}$ subsection as the second subset, wherein $j=\lfloor S/2 \rfloor$, indicating rounding S/2 down, or wherein $j=\lceil S/2 \rceil$, indicating rounding S/2 up.

11. The controller according to claim 9, wherein grouping the N physical storage devices into S subsections comprises:

sequencing the N physical storage devices according to the degrees of wear of the N storage devices in descending order, wherein a physical storage device with a maximum degree of wear is numbered 1, and wherein a physical storage device with a minimum degree of wear is numbered N;

calculating a difference between degrees of wear of an $i^{th}$ physical storage device and an $(i+1)^{th}$ physical storage device, wherein $0<i<N$;

when the difference between the degrees of wear of the $i^{th}$ physical storage device and the $(i+1)^{th}$ physical storage device is smaller than or equal to a second wear threshold, grouping the $i^{th}$ physical storage device into one subsection, grouping the $(i+1)^{th}$ physical storage device into another subsection, adding 1 to i, and continuing to calculate a difference between degrees of wear of an $i^{th}$ physical storage device and an $(i+1)^{th}$ physical storage device; and when the difference between the degrees of wear of the $i^{th}$ physical storage device and the $(i+1)^{th}$ physical storage device is greater than the second wear threshold, grouping the $(i+1)^{th}$ physical storage device into a subsection to which the $i^{th}$ physical storage device belongs, add 1 to i, and continuing to calculate a difference between degrees of wear of an $i^{th}$ physical storage device and an $(i+1)^{th}$ physical storage device.

12. The controller according to claim 7, wherein dividing the storage array into the first subset and the second subset comprises:

forming the first subset with physical storage devices whose degrees of wear are greater than or equal to a first wear threshold; and forming the second subset with physical storage devices whose degrees of wear are smaller than the first wear threshold.

* * * * *

UNITED STATES PATENT AND TRADEMARK OFFICE
CERTIFICATE OF CORRECTION

| | |
|---|---|
| PATENT NO. | : 9,747,050 B2 |
| APPLICATION NO. | : 15/425165 |
| DATED | : August 29, 2017 |
| INVENTOR(S) | : Tao Gong |

It is certified that error appears in the above-identified patent and that said Letters Patent is hereby corrected as shown below:

On the Title Page

Page 2, item (56) Other Publications, should read:
BALAKRISHNAN, M., et al., "Differential RAID: Rethinking RAID for SSD Reliability," EuroSys, April 13-16, 2010, 12 pages.

Signed and Sealed this
Twenty-fourth Day of October, 2017

Joseph Matal
*Performing the Functions and Duties of the
Under Secretary of Commerce for Intellectual Property and
Director of the United States Patent and Trademark Office*